United States Patent [19]

Takegami et al.

[11] Patent Number: 4,588,414

[45] Date of Patent: May 13, 1986

[54] COUNTERCURRENT, COOLING CRYSTALLIZATION AND PURIFICATION METHOD FOR MULTI-COMPONENT MOLTEN MIXTURE

[75] Inventors: Keizo Takegami, Kanagawa; Minoru Morita, Tokyo; Kazuto Nakamaru, Chiba; Koji Miwa, Kanagawa, all of Japan

[73] Assignees: Tsukishima Kikai Co., Ltd.; Mitsubishi Gas Chemical Company, Inc., both of Tokyo, Japan

[21] Appl. No.: 535,456

[22] Filed: Sep. 23, 1983

[30] Foreign Application Priority Data

Oct. 5, 1982 [JP] Japan .................. 57-175168

[51] Int. Cl.[4] ................................ B01D 9/02
[52] U.S. Cl. ........................ 23/295 R; 62/542; 260/707
[58] Field of Search .......... 422/251; 23/295 R; 260/707; 62/542

[56] References Cited

U.S. PATENT DOCUMENTS

| | | | |
|---|---|---|---|
| 2,851,368 | 9/1958 | Findlay | 422/251 |
| 3,177,265 | 4/1965 | Lammers | 260/707 |
| 3,410,923 | 11/1968 | Strand et al. | 422/251 |
| 3,544,646 | 12/1970 | Broughton | 260/707 |
| 3,560,585 | 2/1971 | La Fay et al. | 422/251 |
| 3,593,536 | 7/1971 | La Fay et al. | 422/251 |
| 4,430,140 | 2/1984 | Van Pelt et al. | 62/542 |

Primary Examiner—David L. Lacey
Attorney, Agent, or Firm—Flynn, Thiel, Boutell & Tanis

[57] ABSTRACT

A countercurrent, cooling crystallization and purification method for a multi-component molten mixture wherein the mixture is treated by a purification system comprising one or more crystallizers (1A, 1B) each having, at the respective upper portion, a clarifying portion (10A, 10B) and a purifier (2) arranged in series to the crystallizer or crystallizers and having, at its upper portion, a clarifying portion (20), the crystallizer or crystallizers and the purifier having a temperature difference therebetween and disposed in the order of temperature. The starting mixture is fed to one of the crystallizers and subjected to crystallization there, and the resulting crystals are taken out from the bottom of the crystallizer and fed to another crystallizer or a purifier of higher temperature while the clarified liquid, i.e., mother liquor positioned at the clarifying portion of the crystallizer is led to another crystallizer of lower temperature or discharged out of the system. In each of the crystallizers and purifier, the crystals are moved downwardly while the mother liquor is moved upwardly to effect countercurrent contact with the mother liquor. Through this countercurrent contact of the crystals with the mother liquor of higher temperature, the crystals are purified by being washed with the mother liquor. With this arrangement, the purification of the mixture can be attained effectively and at a reasonable cost.

8 Claims, 1 Drawing Figure

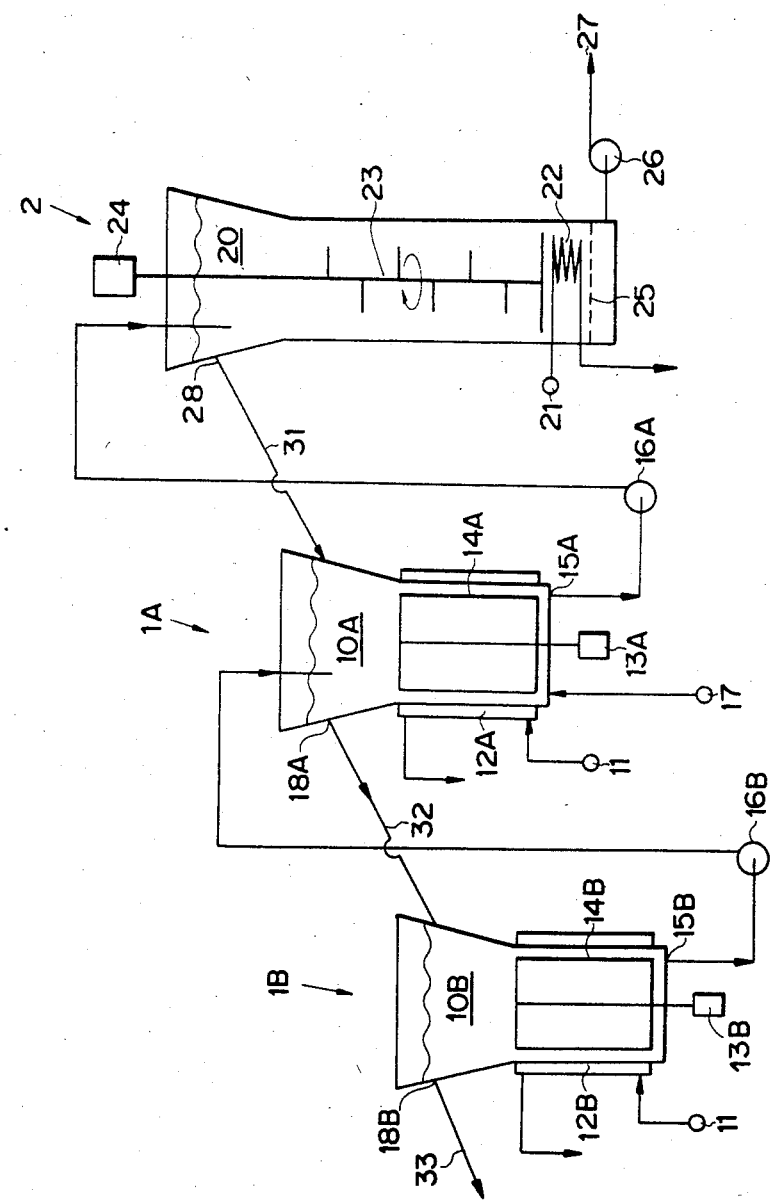

COUNTERCURRENT, COOLING CRYSTALLIZATION AND PURIFICATION METHOD FOR MULTI-COMPONENT MOLTEN MIXTURE

BACKGROUND OF THE INVENTION

1. Field of the Invention

This invention relates to a countercurrent, cooling crystallization and purification method for a multi-component molten mixture. More particularly, this invention relates to a method for separation in pure form of one component from the multi-component molten mixture by employing a cooling-type crystallizer or crystallizers and a vertical, melting-type purifier in combination.

2. Description of Prior Art

To separate a component, in pure form, out of the multi-component mixture, a unit operation such as distillation or extraction is usually carried out. However, the former is disadvantageous in that it consumes a lot of heat energy, and the latter has such a disadvantage that the operation is very complicated and yet the purity of the product is not always satisfactory. In this connection, it is to be noted that if a desired component, for example component A, can be crystallized in pure form, at a certain concentration, upon cooling of the multi-component molten mixture, the desired separation can be attained by crystallization.

The separation procedure by crystallization, especially in commercial operation, will now be explained in more detail. The starting multi-component molten mixture is cooled to crystallize the component A out of the mixture and the crystallized component A is subjected to solid-liquid separation to obtain the pure component A in the form of crystals. As these operations proceed, the contents of the component, for example component B, other than the component A will be increased in the mother liquor from which the component A has been separated. To further recover the component A which is still contained in the mother liquor, the mother liquor is further cooled to a temperature lower than the crystallization temperature of the first stage. Therefore, the crystallization is usually carried out in such a manner that (1) a plurality of unit crystallizers are arranged in series to form a continuous multi-stage crystallization system or (2) a horizontal, agitated crystallizer is operated continuously.

In the former case (1), the temperatures of the crystallizers are different from each other and the crystallizers are arranged in order of temperature, i.e., from higher temperature to lower temperature. The liquid to be treated flows in that order. In this method, however, the crystals formed are suspended in and mixed with the mother liquor in the respective crystallizers and the crystals are transported along with the mother liquor to the crystallizers of the succeeding stages. As a result, in the crystallizer of the final stage, the crystals of the component A coexist with the mother liquor whose concentration of the component B is highest among the crystallizers. Accordingly, the mother liquor remaining on and adhering to the crystals after separation operation of the crystals by a solid-liquid separator has a high concentration of the component B. Thus, it is difficult to obtain the component A in pure form.

In this connection, it is to be noted that, in the multi-stage crystallization system of the above-mentioned type, the crystals of component A are preferred to contact the mother liquor containing component B countercurrently. With this arrangement, the product crystals can be obtained from the crystallizer of the first stage in which the content of component B is lowest, so that the contamination of the product with the component B can be minimized.

Such countercurrent arrangement is widely employed in the operation of crystallization. In the simplest example of the arrangement of this type, the feed liquid is generally allowed to flow sequentially to the crystallizers in series and the crystals formed in each of the crystallizers are separated by a solid-liquid separator provided between the respective crystallizers so as to feed the obtained crystals to the crystallizer of higher temperature and let the mother liquor flow to the crystallizer of lower temperature. This method is desirable in that the transportation direction of the crystals is opposite to that of the mother liquor flow so that the crystals may sequentially come into contact with a mother liquor having a higher content of component A in the crystallizer of higher temperature and the component B adhering to the crystals may be diluted by such a mother liquor. This method, however, is not desirable in cost because it requires an expensive solid-liquid separator such as a filter or a centrifugal separator and it takes considerable cost for operation and maintenance of the separator.

The conventional method (2) is carried out for example by an apparatus comprising a crystallizer provided with a ribbon blade and a horizontal cooling jacket. In this apparatus, crystals produced by cooling a feed liquid are continuously transported in one direction and a mother liquor is allowed to continuously flow in the opposite direction. However, the intended countercurrent contact between the crystals and the mother liquor is not always attained because the crystals are suspended in the liquor and carried along with the liquor. This apparatus has another disadvantage that it should be long enough to acquire desired temperature difference between the product recovering portion and the portion containing the liquor of low purity, i.e., to attain temperature difference between the melting point of the product and the crystallization point of the mother liquor containing comparatively large amount of impurities, because it requires a distance of 2 m to acquire temperature difference of 1° C. Thus, the apparatus requires a considerably large space for the installation thereof. The apparatus further has a disadvantage that the transportation of the crystals is not carried out uniformly in the crystallizer so that the relative contact between the cold crystals and the hot mother liquor cannot be stable and the amount of crystal formation is varied, rendering the operation unstable.

In these conventional methods, the crystals obtained from the crystallizer or crystallizers are generally fed to a vertical, melting-type purifier so as to be purified there or subjected to a separating operation for example by a centrifugal separator to obtain the crystals as products. In the former case, the purifier is combined with the crystallizer or crystallizers in series to effect continuous separation operation. The purifier employed in these conventional methods is not provided with a settler or clarifier for separating the mother liquor from crystals so as to feed the liquor to the crystallizer or crystallizers of lower temperature. For this reason, the crystals formed are inevitably transported along with the liquor and the separation efficiency is not high. To solve this problem, it is proposed to provide a settler for separating the crystals from the mother liquor.

In the latter case, the mother liquor cannot completely be removed from the crystals by the centrifugal separation etc. and it cannot completely be eliminated even after washing. Thus, there is a limit in purity of the crystals which can be attained by this method. More specifically, a cake obtained by the centrifugal dehydration has many voids between grains of the crystals. The grains are strongly combined with each other and the voids are filled with a gas, so that a washing liquid which is accelerated by a centrifugal force is caused to pass by the grains without having sufficient contact with the grains and without penetrating into contact surfaces of the grains. Thus, there is a limit in purity attainable by this method, and it is required to repeatedly carry out recrystallization for improving the purity of the obtained crystals.

OBJECT OF THE INVENTION

The present invention has been made to solve the problems involved in the conventional techniques, and therefore it is an object of the present invention to provide a method for purification which can be attained economically and yet with high purification efficiency.

SUMMARY OF THE INVENTION

In accordance with the present invention, there is provided a countercurrent, cooling crystallization and purification method for a multi-component molten mixture wherein the purification of the molten mixture is effected by countercurrent contact of crystals formed with a mother liquor, which method is characterized in that a cooling type crystallizer having, at its upper portion, a clarifying portion is used in combination with a vertical purifier having, at its upper portion, a clarifying portion and, at its lower portion, a heating means and adapted to be operated at a temperature higher than the crystallizer, and operated in such a manner that crystals formed in the crystallizer are fed to the clarifying portion of the purifier, the crystals in the purifier are allowed to move downwardly and are made molten by the heating means, a portion of the resulting melt is drawn out as a product and the remainder is allowed to move upwardly as a reflux to wash the descending crystals, and the clarified liquid at the clarifying portion of the purifier is led to the clarifying portion of the crystallizer.

DESCRIPTION OF THE DRAWING

The drawing is a flow diagram of one preferred form of a system for carrying out the purification of a multi-component molten mixture according to the present invention.

DESCRIPTION OF THE EMBODIMENTS

Referring now to the drawing, there is illustrated a system for carrying out the purification of a multicomponent molten mixture according to the present invention. This system comprises two crystallizers, a first crystallizer 1A and a second crystallizer 1B and a purifier 2 connected to the first crystallizer 1A in series.

The first and the second crystallizers 1A, 1B are each provided, at their respective upper portions, with a clarifying section 10A, 10B and, at their respective lower portion, with a cooling jacket 12A, 12B. The cooling jackets 12A and 12B in which a coolant flows are disposed around the crystallizers 1A and 1B, respectively. Each of the crystallizers 1A, 1B further has a scraper 14A, 14B for scraping a heat-transfer surface thereof which is adapted to be rotated by a driving means 13A, 13B.

The crystallizers 1A and 1B further have, at their bottom portions, outlets 15A and 15B for taking out crystal slurry therethrough, respectively. The crystal slurry taken out through the slurry taking-out outlet 15B is fed, by a slurry pump 16B, to the clarifying portion 10A of the first crystallizer 1A and the crystal slurry drawn out from the outlet 15A is fed, by a slurry pump 16A, to a clarifying portion 20 provided at the upper portion of the purifier 2. The first crystallizer 1A further has, at the bottom thereof, an inlet for feeding a multi-component molten mixture 17, for example an eutectic system, comprising a component A and a component B wherein the crystallizing temperature of the component A is higher than that of the mixture of the components A and B.

The purifier 2 is of a vertical type and has the clarifying portion 20 at the upper portion thereof as described above. The structure and operation of the purifier 2 are generally known, except for the clarifying portion 20, for example by Japanese Patent Application Publication No. 34705/1979. More specifically, the purifier 2 has, at the lower portio thereof, a heating means 22 through which a heating medium 21 such as steam is passed to melt crystals and, along the substantial length thereof, an agitator 23 adapted to be operated by a driving motor 24 for stabilizing the behavior of a crystal grains layer formed at a position lower than the clarifying portion 20. A screen 25 is provided at the bottom of the purifier 2 for removing insoluble impurities (solids), while allowing a portion of the melt to be taken out as a product 27 by a pump 26.

The purifier 2 has an overflow opening 28 at the upper portion thereof so that the clarified liquid in the purifier 2 is fed through a pipe 31 to the clarifying portion 10A of the first crystallizer 1A by gravity. Similarly, the clarifying portion 10A of the first crystallizer 1A has an overflow opening 18A and the clarified liquid overflowing from the opening 18A is guided by a pipe 32 to the clarifying portion 10B of the second crystallizer 1B. The clarifying portion 10B of the second crystallizer 1B also has an overflow opening 18B through which the clarified liquid overflows and is discharged out of the system through a pipe 33.

In the purification arrangement as described above, the second crystallizer 1B is operated at a temperature lower than the first crystallizer 1A and the first crystallizer 1A is operated at a temperature lower than the purifier 2. For example, the crystallizing temperature of the second crystallizer 1B is 13° C., that of the first crystallizer 1A is 43° C., the temperature of the upper portion of the purifier 2 is 48° C. and that of the lower portion thereof is 53° C.

When a multi-component molten mixture 17 is supplied to the first crystallizer 1A, the mixture 17 is cooled by the cooling surface thereof and supersaturated. The supersaturated liquor is then in contact with crystals already formed, which causes further formation and growth of crystals. The resulting crystal slurry is guided to the clarifying portion 20 of the purifier 2. Similarly, the crystal slurry resulting from the crystallizing operation in the second crystallizer 1B is guided to the clarifying portion 10A of the first crystallizer 1A.

The crystals and mother liquor of the crystal slurry guided into the clarifier 20 of the purifier 2 are dispersed, diluted and washed by the mother liquor of higher purity which flows upwardly and the crystals move downwardly to the crystal grains layer. In the crystal grains layer, the crystals slowly move downwardly while they are countercurrently brought into contact with the molten reflux which moves upwardly. Through this countercurrent contact with the reflux, the surfaces of the crystals are dissolved and washed by the reflux and the crystals reach a melting portion of the heating means 22. The crystals are made molten there and a part of the melt is extracted as a product. The remaining melt is refluxed upwardly and used to wash the descending crystals. These operations are carried out continuously.

The clarified liquid diluted and clarified at the clarifying portion 20 of the purifier 2 is fed back to the first crystallizer 1A and subjected to the crystallization there. At the upper portion of the first crystallizer 1A, the crystal slurry fed from the second crystallizer 1B is mixed with the mother liquor in the first crystallizer 1A so that the crystals are washed with the mother liquor of the first crystallizer 1A. As a result, the crystals are purified and the purified crystals are lowered to a crystal generating portion.

On the other hand, the mother liquor obtained under the crystallization conditions of the first crystallizer 1A is guided to the clarifying portion 1B of the second crystallizer 1B and subjected to crystallization there, too, to further recover the component A from the mother liquor by lowering the temperature of the mother liquor. The mother liquor after such crystallization in the second crystallizer 1B is discharged out of the system.

As described above, according to the present invention, the crystals can countercurrently contact the mother liquor surely and positively, so that the purification efficiency can be improved very much. In this connection, it is to be noted that a solid-liquid separator may be omitted in the present invention system so that the cost required for installation and operation of the separator can be curtailed.

Of course, a solid-liquid separator such as a cyclone separator, filter, or centrifugal separator may be provided between the crystallizers and/or between the crystallizer and the purifier according to need.

Alternatively, the crystallizer may be provided with a partition to separate the clarifying portion from the crystallization portion, if necessary. With this arrangement, the crystals are prevented from entering the clarifying portion. The feeding point of the starting mixture is suitably selected according to the component A concentration of the mixture. More specifically, if the mixture has a high component A concentration, it may be fed to a crystallizer of higher temperature, and if the mixture has a low component A concentration, it is to be fed to a crystallizer of lower temperature. Although the purity attainable by the present method is satisfactorily high, the operation of the present invention may be repeated to further improve the purity, if necessary.

Although two crystallizers are used in the embodiment as described above, the number of the crystallizers is not critical. As the case may be, one crystallizer suffices so long as it is used in combination with a purifier. The number of the crystallizers may be suitably selected according to the desired purity and the recovery of the component A.

In this connection, it is to be noted that if a solid-liquid separator is used in the present invention, it will facilitate the maintenance of desired temperature difference between the crystallizers or between the crystallizer and the purifier. Otherwise, since the crystals are moved from the crystallization portion of one crystallizer to the clarifying portion of another crystallizer or purifier while keeping the temperature thereof, the temperatures of the crystallizers and purifier will be averaged and temperature differences between them will be minimized. To acquire the intended temperature differences between the crystallizers and between the crystallizer and the purifier without providing a solid-liquid separator, the crystals may be subjected to evaporation so as to feed the so separated crystals to the clarifying portion. In this case, however, heat energy is additionally needed and the mother liquor is rendered useless. Therefore, if it is needed to acquire considerable temperature differences between the crystallizers and/or between the crystallizer and the purifier, it is preferable to employ a filter or a cyclone separator for separating the crystals from the mother liquor to allow only the crystals to be transported to the clarifying portion. If the filter is employed, a temperature difference of max. 30° C. can be attained, and if the cyclone separator is employed, a temperature difference of 5° C., max. 10° to 15° C. can be attained. The separated mother liquor is returned to the clarifying portion of the crystallizer in case of the filter and to the lower portion of the clarifying portion or the crystallization portion in case of the cyclone separator.

It is further to be noted that the type of the crystallizer is not limited to that of the crystallizer adapted to be cooled indirectly through the jacket as illustrated in the drawing.

As an example of other types of crystallizers, there can be mentioned:

(1) A crystallizer wherein a coolant insoluble in the mother liquor is directly blown into the solution to cool it by a latent heat of vaporization. In this case, the coolant may be freon, ammonia, liquefied natural gas, etc. The evaporated coolant is liquefied by a condenser and recycled. This type of crystallizer is suitable for the separation of p-xylene and o-xylene in which ethylene is directly blown.

(2) A crystallizer which is suitable for a system wherein a melt and a solvent are soluble with each other and the solvent is evaporated under reduced pressure. The solution is cooled by a latent heat of evaporation. This crystallizer may be suitably employed for example for the system comprising a melt of monochloroacetic acid and water which is crystallized under reduced pressure.

(3) A crystallizer which is suitable for a melt of a eutectic system. One component of the system is evaporated under reduced pressure and the melt is cooled by a latent heat of evaporation. This may be used for example for the separation of p-xylene and o-xylene which are evaporated under reduced pressure to cool the melt by a latent heat of evaporation. In this connection, it is to be noted that these crystallizers each have a clarifying portion inside thereof in accordance with the present invention.

EXAMPLE

The purification of p-dichlorobenzene (PDCB) was carried out using the apparatus as illustrated.

Two crystallizers arranged in series were used in combination with a purifier. Each of the crystallizers has a size of 600 mm in diameter and 1000 mm in height and was of a cooling type provided with a cooling jacket of 600 mm in height. The heat transfer surface area of each of the crystallizers was 1.14 m². The crystallizer had a liquid height of 900 mm and a height of a clarified liquid portion of 300 mm. The purifier was 400 mm in diameter and 2000 mm in height and had, at a lower portion thereof, a heater having a heat transfer surface area of 0.2 m². Each of the crystallizers was provided with an agitator adapted to be rotated at 20 rpm by a 1.5 KW motor, a scraper adapted to scrape the inner wall of the crystallizer adjacent to the cooling jacket and a draft tube located centrally in the crystallizer.

A mixture consisting of 90% of PDCB, 9% of o-dichlorobenzene (ODCB) and 1% of m-dichlorobenzene (MDCB) was fed to the first crystallizer at an average rate of 100 kg/hr. The clarified liquid obtained from the upper portion of the first crystallizer was fed to the second crystallizer, and the crystals obtained were fed to the upper portion of the purifier. The product was extracted from the lower portion of the purifier and the overflow from the upper portion thereof was fed back to the first crystallizer. The overflow from the first crystallizer was fed back to the second crystallizer and subjected to crystallization of PDCB. The resultant crystals were fed to the first crystallizer and the overflow from the second crystallizer was discharged out of the system.

The operating temperature conditions were 43° C. at the first crystallizer, 13° C. at the second crystallizer, 48° C. at the upper portion of the purifier and 53° C. at the lower portion thereof.

The product obtained in the purifier was drawn out at a rate of 83 kg/hr and had a purity of 99.9%. The amount of the reflux in the purifier was 25 to 30 kg/hr. The amount of the crystals fed from the second crystallizer to the first crystallizer was about 70 kg/hr and that of the crystals fed from the first crystallizer to the purifier was about 110 kg/hr. The PDCB concentration of the overflow from the second crystallizer was 40% and the recovery was 92.6%.

As can be seen from this Example, according to the present invention, the heat required for melting the crystals in the purifier is 1/10 to 1/5 of the latent heat of vaporization necessitated in the conventional distillation method. In particular in the purification of a system composed of substances having close boiling points such as a system of the Example, the steam consumption necessary for heating is 1/10 or less as compared with the distillation method because the reflux ratio is 1/10 to 1/100. Thus, the heat energy can be saved very much.

Further according to the present invention, the purity of 99.9% can be attained by one purification operation. By contrast, where the conventional crystallization equipment is used, recrystallization operations should be repeated two or more times to obtain a product of high purity. Thus, the present invention can save energy, and can avoid a product loss which is caused by recrystallization. In addition, the number of operators, which should be two or three when recrystallization operation is needed, can be reduced to 0.5.

We claim:

1. In a countercurrent, cooling crystallization and purification method for a multi-component molten mixture for separating a component of the mixture, wherein the purification of the molten mixture is effected by countercurrent contact of crystals formed with a mother liquor, wherein the improvement comprises, in a system comprising a cooling type crystallizer having, at its upper portion, a clarifying portion containing a liquid and a vertical purifier having, at its upper portion, a clarifying portion and, at its lower portion, heating means, and the contents of said purifier are at a temperature higher than the contents of said crystallizer, feeding said molten mixture into the crystallizer, feeding crystals formed in the crystallizer to the clarifying portion of the purifier, allowing the crystals in the clarifying portion of the purifier to move downwardly therein and melting said crystals by said heating means, withdrawing a portion of the resulting melt as a product and allowing the remainder of said melt to move upwardly in said purifier as a reflux to wash the descending crystals, and feeding the clarified liquid from the clarifying portion of the purifier directly to the liquid in the clarifying portion of the crystallizer in which the crystallization is carried out at a temperature lower than the operation temperature of the purifier so that crystals formed in the crystallizer are washed and the clarified liquid fed from the purifier is cooled by the liquid of a lower temperature in the crystallizer to be recrystallized.

2. A method as claimed in claim 1, further comprising a step of withdrawing from the crystallizer the clarified liquid in the clarifying portion of the crystallizer.

3. In a countercurrent, cooling crystallization and purification method for a multi-component molten mixture for separating a component of the mixture, wherein the purification of the molten mixture is effected by countercurrent contact of crystals formed with a mother liquor, wherein the improvement comprises, in a system comprising a plurality of cooling type crystallizers each having, at their respective upper portions, a clarifying portion containing a liquid, and a vertical purifier having, at its upper portion, a clarifying portion and, at its lower portion, heating means, feeding said molten mixture into one of said crystallizers, effecting crystallization in each of the crystallizers at different temperatures, said purifier being operated at a temperature higher than any of the crystallizers, feeding a slurry containing crystals formed in each of the crystallizers to the clarifying portion of another of the crystallizers wherein the crystallization is effected at a higher temperature and feeding a slurry containing crystals formed in the crystallizer wherein the crystallization is effected at the highest temperature among the crystallizers to the clarifying portion of the purifier, allowing the crystals in the purifier to move downwardly therein and melting said crystals by said heating means, withdrawing a portion of the resulting melt as a product and allowing the remainder of said melt to move upwardly as a reflux in said purifier to wash the descending crystals, feeding the clarified liquids from the clarifying portions of the purifier and the crystallizers directly to the liquids in the respective clarifying portions of the crystallizers of sequentially lower temperature so that crystals formed in each of the crystallizers of sequentially lower temperature are washed and the clarified liquid fed into each crystallizer from the crystallizer of sequentially higher temperature or from the purifier, respectively, is cooled by the liquid of lower temperature in the crystallizer of sequentially lower temperature to be recrystallized, and discharging the clarified liquid in the crystallizer of the lowest temperature from the system.

4. A countercurrent, cooling purification method for a multi-component mixture as claimed in claim 3, further comprising removing liquid from said slurry fed to each of said clarifying portions by a solid liquid separating means.

5. A method as claimed in claim 3, further comprising feeding said molten mixture into the crystallizer having the highest temperature.

6. In a method for purification of a molten mixture to separate a component of said mixture in substantially pure form, including a step of contacting crystals of said component with a countercurrently flowing stream of a mother liquor from which said crystals were crystallized, the improvement which comprises:

feeding said molten mixture into a lower cooling portion of an upright crystallizer and flowing said molten mixture upwardly in said crystallizer toward a first upper clarifying portion containing a liquid located above said lower cooling portion and in direct communication therewith;

cooling said molten mixture as it flows upwardly in said cooling portion of said crystallizer to form a slurry of crystals of said component in said mother liquor;

feeding said slurry into an upper clarifying portion of a purifier so that said crystals flow downwardly toward a lower heating portion which is located below said upper clarifying portion of said purifier and is in direct communication therewith, said second upper clarifying portion of said purifier being at a higher temperature than said crystallizer and said lower heating portion of said purifier being at a higher temperature than said second upper clarifying portion of said purifier;

allowing said crystals to settle in said upper clarifying portion of said purifier so that said crystals descend into said lower heating portion of said purifier;

heating said crystals in said heating portion so that said crystals become molten and form a melt;

withdrawing a portion of said melt as a substantially pure product and flowing the remainder of said melt upwardly in said purifier as a reflux stream in contact with the descending crystals so that a clarified liquid is formed in said upper clarifying portion of said purifier; and feeding the clarified liquid from said upper clarifying portion of said purifier directly to the liquid in said first clarifying portion of said crystallizer, so that said clarified liquid directly contacts and is mixed with the liquid in the first upper clarifying portion of said crystallizer, the crystals in the liquid in the first upper clarifying portion of said crystallizer are washed and the clarified liquid fed from the purifier is cooled by the liquid in the first upper clarifying portion of said crystallizer so as to be recrystallized.

7. A method as claimed in claim 6, further comprising passing said melt downwardly through a filter disposed near the bottom of said purifier to remove solids from said melt, and withdrawing said product portion of said melt from a location on said purifier below said filter.

8. A method for purification of a molten mixture to separate a component of said mixture in substantially pure form, including the steps of:

feeding said molten mixture into a first cooling zone at the lower end of a first crystallizer, said first crystallizer having a first clarifying zone at the upper end thereof and directly communicating with said first cooling zone for receiving first clarified liquid therefrom, said first crystallizer being operated at a first temperature;

cooling said molten mixture while agitating said molten mixture in said cooling zone to obtain at the bottom of said first crystallizer a first slurry comprising crystals of said component and a mother liquor and to obtain a first clarified liquid in said first clarifying zone;

feeding said first slurry from said first cooling zone to a second clarifying zone located at the upper end of a purifier and which is operated at a second temperature which is higher than said first temperature, said purifier having a lower heating zone which is in direct communication with said second clarifying zone and which is operated at a third temperature which is higher than said second temperature;

flowing a melt of said component upwardly in said purifier as a reflux stream that is in contact with and is in countercurrent flow relationship with crystals that are descending from said second clarifying zone toward said lower heating zone, and agitating the mixture of said crystals and said melt in said purifier and obtaining a second clarified liquid in said second clarifying zone;

heating crystals in said lower heating zone to form said melt;

filtering solid impurities from said melt in said lower heating zone;

recovering a portion of said filtered melt from said lower heating zone of said purifier as a substantially pure product;

feeding said second clarified liquid at said second temperature from near the top of said second clarifying zone directly into said first clarified liquid located in said first clarifying zone in the upper portion of said first crystallizer and which is at said first temperature so that crystals in said first clarified liquid are washed and said second clarified liquid is cooled by said first clarified liquid to be recrystallized;

feeding clarified liquid from near the top of said first clarifying zone to a third clarifying zone comprising an upper portion of a second crystallizer, said second crystallizer having a second cooling zone at the lower end thereof and being operated at a fourth temperature lower than said first temperature;

countercurrently washing crystals of said component in said third clarifying zone with said clarified liquid by flowing said clarified liquid upwardly in said third clarifying zone while said crystals settle downwardly therein and enter said second cooling zone;

cooling and agitating said clarified liquid and said crystals in said second cooling zone to obtain a second slurry enriched in said crystals;

feeding said second slurry into said first clarifying zone of said first crystallizer;

countercurrently washing crystals of said component in said first clarifying zone with said clarified liquid by flowing said clarified liquid upwardly in said first clarifying zone while said crystals settle downwardly therein and enter said first cooling zone; and removing clarified liquid near the top of said third clarifying zone from said second crystallizer.

* * * * *

UNITED STATES PATENT AND TRADEMARK OFFICE
CERTIFICATE OF CORRECTION

PATENT NO. : 4 588 414

DATED : May 13, 1986

INVENTOR(S) : Keizo Takegami et al

It is certified that error appears in the above-identified patent and that said Letters Patent is hereby corrected as shown below:

Column 9, line 1; change "solid liquid" to ---solid-liquid---.

Signed and Sealed this

Twenty-first Day of October, 1986

[SEAL]

Attest:

DONALD J. QUIGG

Attesting Officer     Commissioner of Patents and Trademarks